(12) United States Patent
Carbune et al.

(10) Patent No.: US 12,013,887 B2
(45) Date of Patent: Jun. 18, 2024

(54) CONTEXTUAL ESTIMATION OF LINK INFORMATION GAIN

(71) Applicant: GOOGLE LLC, Mountain View, CA (US)

(72) Inventors: Victor Carbune, Zurich (CH); Pedro Gonnet Anders, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/215,032

(22) Filed: Jun. 27, 2023

(65) Prior Publication Data
US 2023/0342384 A1 Oct. 26, 2023

Related U.S. Application Data

(63) Continuation of application No. 17/727,237, filed on Apr. 22, 2022, now Pat. No. 11,720,613, which is a (Continued)

(51) Int. Cl.
*G06F 16/33* (2019.01)
*G06F 16/332* (2019.01)
(Continued)

(52) U.S. Cl.
CPC ...... *G06F 16/3344* (2019.01); *G06F 16/3329* (2019.01); *G06F 16/3347* (2019.01);
(Continued)

(58) Field of Classification Search
CPC .... G06F 16/93; G06F 16/3347; G06F 16/338; G06F 16/3344
See application file for complete search history.

(56) References Cited

U.S. PATENT DOCUMENTS 9,037,573 B2  5/2015 Patterson
9,779,441 B1 * 10/2017 Jadhav ................. G06F 16/353
(Continued)

FOREIGN PATENT DOCUMENTS

WO  2020081082  4/2020

OTHER PUBLICATIONS

European Patent Office; Decision to Refuse issued in Application No. 18797433.2, 14 pages, dated Mar. 22, 2023.
(Continued)

*Primary Examiner* — Eliyah S. Harper
(74) *Attorney, Agent, or Firm* — Gray Ice Higdon

(57) ABSTRACT

Techniques are described herein for determining an information gain score for one or more documents of interest to the user and present information from the documents based on the information gain score. An information gain score for a given document is indicative of additional information that is included in the document beyond information contained in documents that were previously viewed by the user. In some implementations, the information gain score may be determined for one or more documents by applying data from the documents across a machine learning model to generate an information gain score. Based on the information gain scores of a set of documents, the documents can be provided to the user in a manner that reflects the likely information gain that can be attained by the user if the user were to view the documents.

20 Claims, 6 Drawing Sheets

Related U.S. Application Data continuation of application No. 16/608,628, filed as application No. PCT/US2018/056483 on Oct. 18, 2018, now Pat. No. 11,354,342.

(51) Int. Cl.

| | | |
|---|---|---|
| *G06F 16/338* | (2019.01) | |
| *G06F 16/93* | (2019.01) | |
| *G06F 40/40* | (2020.01) | |
| *G06V 30/418* | (2022.01) | |
| *H04L 51/02* | (2022.01) | |
| *G06F 3/0482* | (2013.01) | |

(52) U.S. Cl.
CPC ............ *G06F 16/338* (2019.01); *G06F 16/93* (2019.01); *G06F 40/40* (2020.01); *G06V 30/418* (2022.01); *H04L 51/02* (2013.01); *G06F 3/0482* (2013.01)

(56) References Cited

U.S. PATENT DOCUMENTS

| | | | |
|---|---|---|---|
| 11,354,342 B2 | 6/2022 | Carbune et al. | |
| 2006/0020607 A1* | 1/2006 | Patterson | G06F 16/313 707/E17.084 |
| 2007/0299862 A1* | 12/2007 | Aggarwal | G06F 16/40 707/999.102 |
| 2008/0052273 A1 | 2/2008 | Pickens | |
| 2008/0319971 A1* | 12/2008 | Patterson | G06F 16/9535 707/999.005 |
| 2009/0210406 A1* | 8/2009 | Freire | G06F 16/35 707/999.005 |
| 2009/0210407 A1* | 8/2009 | Freire | G06F 16/951 707/999.005 |
| 2010/0121840 A1* | 5/2010 | Murdock | G06F 16/3346 703/13 |
| 2011/0029513 A1* | 2/2011 | Morris | G06F 16/951 707/E17.014 |
| 2012/0158710 A1* | 6/2012 | Burges | G06N 20/00 707/E17.084 |
| 2012/0233258 A1 | 9/2012 | Vijayaraghavan et al. | |
| 2012/0308121 A1* | 12/2012 | Datta | G06V 40/168 382/155 |
| 2013/0166280 A1 | 6/2013 | Quast et al. | |
| 2015/0254230 A1* | 9/2015 | Papadopoullos | G06F 16/3331 707/739 |
| 2016/0224666 A1 | 8/2016 | Horvitz et al. | |
| 2017/0235848 A1 | 8/2017 | Van Dusen et al. | |
| 2018/0060029 A1 | 3/2018 | Kogan et al. | |
| 2019/0005314 A1* | 1/2019 | De Knijf | H04L 63/0861 |
| 2020/0349181 A1 | 11/2020 | Carbune et al. | |
| 2022/0245182 A1 | 8/2022 | Carbune et al. | |

OTHER PUBLICATIONS

European Patent Office; Result of Consultation, Preliminary Opinion issued in Application No. 18797433.2, 10 pages, dated Feb. 22, 2023.
European Patent Office; Summons to Attend Oral Proceedings issued in Application No. 18797433.2, 9 pages, dated Oct. 18, 2022.
European Patent Office; Communication Pursuant to Article 94(3) EPC issued in U.S. Appl. No. 18/797,433; 6 pages; dated Sep. 23, 2021.
Yang, Y. et al. "A Comparative Study on Feature Selection in Text Categorization," Proceedings of the International Conference on Machine Learning; XP-002119806; 9 pages, Jul. 8, 1997.
Habibi, M. et al. "Keyword Extraction and Clustering for Document Recommendation in Conversations;" IEEE/ACM Transactions on Audio, Speech, and Language Processing, vol. 23, No. 4; XP011574730, ISSN: 2329-9290, DOI: 10.1109/TASLP.2015.2405482; 14 pages; Apr. 1, 2015.
International Search Report and Written Opinion issued in Application No. PCT/US2018/056483, dated Jan. 8, 2019.

\* cited by examiner

CONTEXTUAL ESTIMATION OF LINK INFORMATION GAIN

BACKGROUND

An individual (also referred to herein as a "user") may be provided, via one or more computing devices, with information from one or more documents that share a topic. For example, a user may submit a search request and be provided with a set of documents and/or links to documents that are responsive to the submitted search request. Also, for example, a user may be provided with a document based on identified interests of the user, previously viewed documents of the user, and/or other criteria that may be utilized to identify and provide a document of interest. Information from the documents may be provided via, for example, an automated assistant and/or as results to a search engine. Further, information from the documents may be provided to the user in response to a search request and/or may be automatically served to the user based on continued searching after the user has ended a search session.

In some cases, a subset of information may be extracted from the document for presentation to the user. For example, when a user engages in a spoken human-to-computer dialog with an automated assistant software process (also referred to as "chatbots," "interactive personal assistants," "intelligent personal assistants," "personal voice assistants," "conversational agents," "virtual assistants," etc.), the automated assistant may perform various types of processing to extract salient information from a document, so that the automated assistant can present the information in an abbreviated form. As another example, some search engines will provide summary information from one or more responsive and/or relevant documents, in addition to or instead of links to responsive and/or relevant documents, in response to a user's search query.

However, when a set of documents is identified that share a topic, many of the documents may include similar information. For example, a user may submit a search related to resolving a computer issue (e.g., bug, malware, configuration, etc.) and may subsequently be provided with multiple documents that include a similar listing of solutions, remedial steps, resources, etc. Thus, although two documents that share a topic may be relevant to the request or interest of the user, the user may have less interest in viewing a second document after already viewing the same or similar information in a first document or set of documents.

SUMMARY

Implementations described herein relate to determining an information gain score for one or more documents of potential interest to the user and presenting information from one or more of those documents that are selected based on their respective information gain scores. An information gain score for a given document is indicative of additional information that is included in the given document beyond information contained in other documents that were already presented to the user. Information from documents may be presented to a user in various ways, such as opening the entire document (e.g., in a web browser or another applicable software application), audibly reading the entire content of the document to the user, extracting and audibly/visually presenting salient information extracted from the document to the user, etc.

In some implementations, information gain scores may be determined for one or more documents by applying data indicative of the documents, such as their entire contents, salient extracted information, a semantic representation (e.g., an embedding, a feature vector, a bag-of-words representation, a histogram generated from words/phrases in the document, etc.) across a machine learning model to generate an information gain score. For example, in some implementations, data indicative of one or more previously-presented documents, along with data indicative of one or more yet-to-be presented (or "new") documents, may be applied as input across a trained machine learning model to generate output indicative of an information gain score of the one or more new documents. Based on the information gain scores, information contained in one or more of the new documents may be selectively provided to the user in a manner that reflects the likely information gain that can be attained by the user if the user were to be presented information from the selected documents.

In some implementations, a first set of documents that have been presented to (e.g., viewed by, audibly rendered in whole or in part, etc.) the user is identified. The documents of the first set share a common topic and can be identified based on being previously provided to the user, e.g., by an automated assistant in response to natural language input of the user, in a web browser, in another applicable software application, etc. The user may search for a topic and one or more documents responsive documents may be returned (e.g., as a list of search results and/or queued up for potential presentation by an automated assistant). As an example, the user may ask an automated assistant, "Give me information about fixing my computer" and the automated assistant may provide, either via a visual interface or via text to speech, data indicative of one or more responsive (and/or relevant) documents. A first responsive document may include information related to troubleshooting software application issues and the user may view and/or listen to the contents of the first document. Further, the set may include a second document that includes hardware repair information and the user may additionally view the second document.

A second set of documents is identified that is also related to the topic of the first set of documents but that have not yet been viewed by the user. For example, a document may be identified that includes information related to both hardware and software repair. For each new document in the second set of documents, an information gain score is determined that is indicative of, for the new document, whether the new document includes information that was not contained in the documents of the first set of documents (i.e., the documents from which information was already presented the user). For example, an information gain score for a document that includes information related to general computer repair, which may include software troubleshooting information, may be less indicative of information gain if the user has already previously viewed a document that includes information about common software application repairs.

Based on the information gain scores, one or more of the new documents may be selected to provide to the user, and/or the new documents may be ranked based on their respective information scores. For example, ten documents may be identified in a second set of documents and information from the document with an information gain score most indicative of information gain can be presented to the user by an automated assistant. In some implementations, the new documents can be ranked and as the user views additional documents, the second set of documents can be re-ranked based on new information gain scores. For example, information scores of the second set of documents may be recalculated based on one or more of the new documents being presented to the user, and therefore, moved from the second set the first set of documents.

In some implementations, data from each of the documents of the second set of documents may be applied across a machine learning model as input, e.g., in conjunction with data from the first set of documents, and the information gain score may be determined based on the output of the machine learning model. In some implementations, rather than the content of the document itself being applied across the machine learning model, an alternative representation of the document, such as a semantic feature vector or embedding, a "bag-of-words" representation, etc., may be generated from each of the documents and applied as input across the machine learning model.

In some implementations, one or more of the new documents of the second set may be presented in a manner that is selected based on the information gain stores. For example, one or more of the new documents can be rendered as part of a search results interface that is presented to the user in response to a query that includes the topic of the documents, such as references to one or more documents. In some implementations, these search results may be ranked at least in part based on their respective information gain scores. The user can then select one of the references and information contained in the particular document can be presented to the user. Subsequently, the user may return to the search results and the references to the document may again be provided to the user but updated based on new information gain scores for the documents that are referenced. In some implementations, the references may be reranked and/or one or more documents may be excluded (or significantly demoted) from the search results based on the new information gain scores that were determined based on the document that was already viewed by the user. As the user views additional documents, the updated information gain scores will be updated to reflect information already viewed by the user and the information contained in the unviewed documents.

The above is provided as an overview of some implementations disclosed herein. Further description of these and other implementations is provided below.

In some implementations, a method performed by one or more processors is provided that includes: identifying a first set of one or more documents that share a topic, wherein information extracted from each document of the first set was previously presented to a user, in response to free form natural language input from the user, by an automated assistant executing at least in part on one or more computing devices operated by the user; identifying a second set of multiple new documents that also share the topic, wherein the automated assistant has not yet presented information contained in each new document of the second set for presentation to the user; determining, for each new document of the second set, an information gain score, wherein the information gain score for a given new document of the second set is indicative of additional information that would be gained by the user, beyond the information extracted from the one or more document of the first set, if the information contained in the given new document were extracted and presented to the user; selecting a new document from the second set based on the information gain scores; and presenting information extracted from the selected new document to the user via one or more of the computing devices.

In various implementations, the method may further include ranking the second set of new documents based on the information gain scores, wherein the selecting is based on the ranking. In various implementations, determining the information gain score for the given new document may include: applying first data indicative of the information extracted from the first set of documents and second data indicative of information extracted from the given new document across a machine learning model to generate output, wherein the information gain score is determined based on the output.

In various implementations, the first data may include a semantic feature vector generated from the information extracted from the first set of documents, and the second data may include a semantic feature vector generated from the information extracted from the given new document.

In another aspect, a method implemented using one or more processors may include: identifying a first set of one or more documents that share a topic, wherein each document of the first set was accessed by a user on one or more computing devices operated by the user; identifying a second set of multiple new documents that also share the topic, wherein the user has not previously accessed the multiple new documents of the second set; determining, for each new document of the second set, an information gain score, wherein the information gain score for a given new document of the second set is indicative of additional information that would be gained by the user, beyond information obtained by the user while accessing the first set of one or more documents, if the user accessed the given new document; selecting a new document from the second set based on the information gain scores; and presenting information indicative of one or more of the new documents of the second set to the user via one or more of the computing devices, wherein the information indicative of one or more of the new documents of the second set is presented in a manner that is selected based on the information gain stores.

In various implementations, the method may further include presenting a ranked list of the second set of new documents, wherein the list is ranked based on the information gain scores. In various implementations, identifying the first set may include: rendering, as part of a search results interface that is presented to the user in response to a query that includes the topic, references to one or more documents of the first set; receiving user input that that indicates selection of a reference to a particular document of the first set from the search results interface, wherein at least part of the particular document is provided to the user in response to the selection; receiving user input indicative of a command to return to the search results interface; and in response to receiving the user input indicative of the command to return to the search results interface, rendering, as part of the search results interface, references to one or more documents of the second set.

In various implementations, rendering the references to one or more documents of the second set may include excluding, from the search results interface, at least the reference to the particular document of the first set. In various implementations, determining the information gain score for the given new document may include: applying first data indicative of the first set of documents and second data indicative of the given new document across a machine learning model to generate output, wherein the information gain score is determined based on the output.

In another related aspect, a method implemented using one or more processors may include: identifying a first document that includes a first information element and a second information element, wherein the first information element is different than the second information element; processing one or more portions of the document that include the first and second information elements using text-to-speech ("TTS") processing to generate TTS output that conveys the first and second information elements; providing, at one or more computing devices operated by a user, the TTS output; identifying a second document that includes the second information element and a third information element, wherein the third information element is different from the first and second information elements; determining, based on the providing, that the second information element has already been conveyed to the user; in response to the determining, processing one or more portions of the second document that include the third information element using additional TTS processing to generate additional TTS output that conveys the third information element and excludes the second information element; and providing, at one or more computing devices operated by a user, the additional TTS output.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
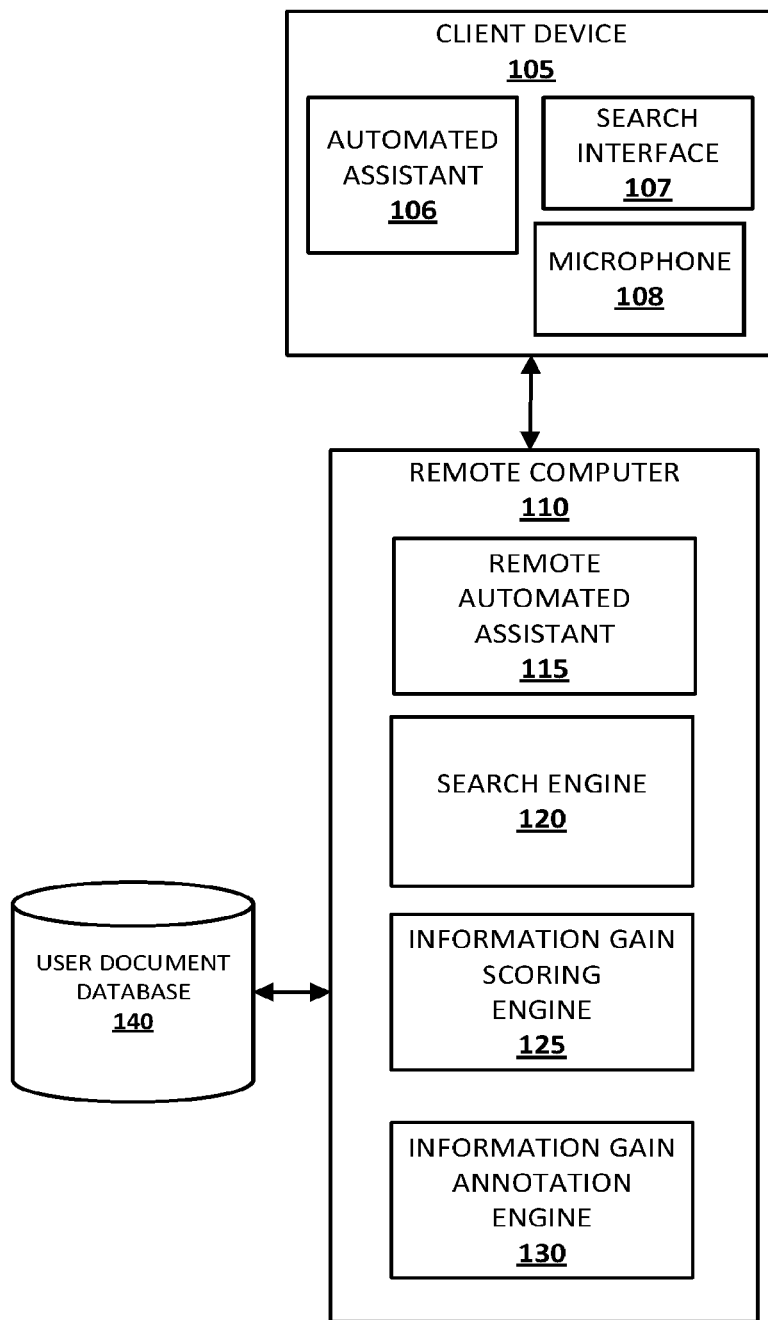
FIG. 1 is a block diagram of an example environment in which implementations disclosed herein can be implemented.

Now turning to FIG. 1, an example environment in which techniques disclosed herein can be implemented is illustrated. The example environment includes a client device 105 and a remote computer 110. Although both the client device 105 and the remote computer 110 are each illustrated in FIG. 1 as single components, it is understood that one or more modules and/or aspects of either can be implemented, in whole or in part, by one or more other devices. For example, in some implementations a first set of modules and/or aspects are implemented by one or more processors of a first remote system, and a second set of modules and/or aspects are implemented by one or more processors of one or more separate remote server device(s) that are in network communication with the remote computer 110. The remote server device(s) can be, for example, a cluster of high performance remote server device(s) that handle requests from one or more client devices, as well as requests from additional devices.

Client device 105 may be a mobile phone computing device, a tablet computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client devices may be provided. Further, one or more components of client device 105 may be implemented on separate devices. For example, microphone 108 and/or automated assistant client 106 may be implemented on one or more alternate computing devices that are in communication with client device 105. Components of client device 105 and components of remote computer 1110 can communicate via a communication network. The communication network may include, for example, a wide area network (WAN) (e.g., the Internet). Further, components of client device 105 may communicate with one or more other components via a communication network. For example, communication network may include a local area network (LAN) and/or BLUETOOTH and may communicate with one or more other devices via the LAN and/or BLUETOOTH (e.g., an automated assistant device communicating with a handheld computing device of a user).

Client device 105 includes a microphone 108 that allows the user to provide natural language input to one or more modules of the client device 105. The user's utterances may be captured by the microphone 108 and one or more modules of client device 105 may process the resulting audio data to generate text and/or other audio data that may be further processed by one or more modules of the client device 105 and/or provided via network communication to remote computer 110 for further processing. For example, client device may include a speech to text ("STT") module (not depicted) that processes captured audio into text to provide to remote computer 110. Additionally or alternatively, audio data received by microphone 108 may be provided to remote computer 110, which may include its own STT module (not depicted) for further processing of the audio data.

In some implementations, audio data captured by microphone 108 may include one or more topics of interest to the user. For example, a user may utter an audio phrase of "Help me fix my computer" to automated assistant client 106 executing on client device 105 via microphone 108. Automated assistant client 106 can be part of an automated assistant engine that is executing, with components on the client device 105 and component on the remote computer 110 (e.g., remote automated assistant 115, also referred to as "cloud-based automated assistant components"). The automated assistant client 106 can receive audio data captured by microphone 108 and/or from one or more other input devices that may be utilized by the user. For example, the user may provide natural language input via a keyboard, which may then be provided to the automated assistant client 106 and/or search interface 107, as described herein.

Automated assistant client 106 and remote automated assistant 115 can process natural language input of a user and provide responses in the form of a dialog that includes one or more dialog turns. A dialog turn may include, for instance, user-provided natural language input and a response to natural language input by the automated assistant. Thus, a dialog between the user and the automated assistant can be generated that allows the user to interact with the automated assistant (the phrase "automated assistant" as used herein without a reference numeral may refer to any combination of 105 and 115) in a conversational manner. As an example, the user may submit natural language input of "Help me fix my computer" to the automated assistant client 106. The automated assistant may process the natural language input and identify one or more documents that are responsive and/or relevant to the request of the user (e.g., documents related to computer repair). The automated assistant client 106 may provide one or more of the documents (or portions of one or more of the documents) via a graphical interface of the client device 105. Additionally or alternatively, the automated assistant client 106 may include a text to speech ("TTS") module (not depicted) that converts a portion of an identified document to speech and renders the speech via a speaker (not depicted) of the client device 105. Subsequently, the user can submit additional natural language input to the automated assistant client 106 to further refine a topic search, ask for additional details regarding a document, and/or to submit a new topic.

As used herein, a "dialog session" may include a logically-self-contained exchange of one or more messages (or turns) between a user and automated assistant (and in some cases, other human participants). The automated assistant may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant, and so forth.

With an audio output and, in particular, an audio output using a TTS module, the information output can be considered as linear or serialized. That is, in the "dialog session", a dialog turn can include a user-provided natural language input and a response to the natural language input by the automated assistant, and so the user may wait for substantially all of the response to be output before proceeding. In comparison with reading, the user is able to receive the audio information passively, however, the time taken to output is longer and there is a reduced ability to scan or scroll/skip through the information. As such, it is important in the context of an audio output that the output information is relevant, accurate and concise, in order to avoid an unnecessarily long output, a redundant output, or an extra dialog turn. The information density of the output information becomes particularly important in improving the efficiency of a dialog session. Techniques described herein address these issues by reducing and/or eliminating presentation of information a user has already been provided, including in the audio human-to-computer dialog context.

Remote computer 110 further includes a search engine 120 that identifies one or more relevant documents to a search request. In some implementations, natural language input received by remote automated assistant 115 can be converted into text via a STT module and provided to the search engine 120. In some implementations, client device 105 includes a search interface that allows a user to directly submit text to the search engine 120. For example, search interface 107 may be implemented via a web browser and the user may submit natural language input via the search interface 107 for further processing by the search engine 120. The automated assistant may also submit natural language requests from the user to search engine 120.

Search engine 120 identifies a topic of the user input and identifies documents that are responsive and/or relevant to the input. As an example, a user may submit natural language input of "Help me fix my computer" and search engine 120 may identify references to one or more topics in the search phrase to utilize to identify responsive and/or relevant documents. Identified documents can be scored via multiple methods to determine relevancy of each of the documents as well as likelihood that a document is of interest to the user based on the submitted natural language input. For example, documents that include information related to computer hardware repair, computer software repair, common issues with computer software, troubleshooting guides for particular software applications, and/or other documents can be identified by search engine 120 in response to the user submitting a search phrase of "Help me fix my computer."

One or more of the identified documents, portions of documents, and/or references to one or more of the documents can then be provided to the user based on the identified documents and scores determined for each of the documents. For example, in response to a user submitting a spoken phrase of "Help me fix my computer," a plurality of documents may be identified by the search engine 120, and the highest scoring document may be provided to the automated assistant client 106. A portion of the highest scoring document can be converted to speech via a TTS module and the automated assistant client 106 can then provide the portion of the document as audio in a dialog session between the user and the automated assistant client 106. For example, the automated assistant may provide the first few sentences of a document that includes a troubleshooting guide for common software to the user as a dialog turn in response to the user providing natural language input of "Help me fix my computer." Also, for example, the user may subsequently be provided additional information from the document by submitting audio indicative of interest in continuing with the current document (e.g., "Tell me more") or can indicate an interest in receiving information regarding other documents (e.g., "What other information have you found") in future dialog turns.

Figure 2:
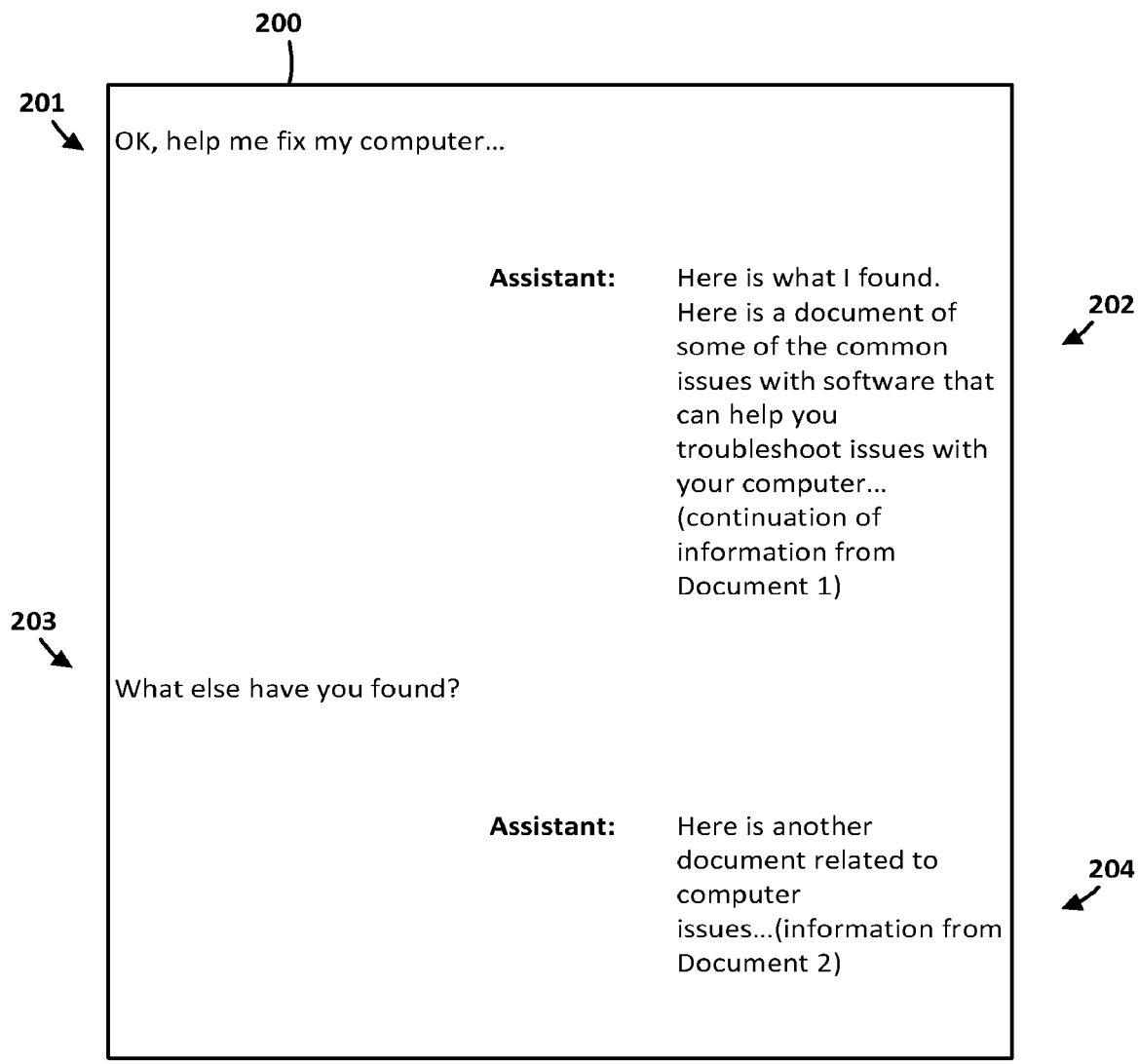
FIG. 2 illustrates an interface for an automated assistant that can provide information from documents to a user based on information gain scores.

As an example, referring to FIG. 2, an example interface of an automated assistant is provided. The interface includes a dialog session between a user and the automated assistant as text. However, in some implementations, the text of each turn of the dialog session may instead be a phrase provided by the user and/or the automated assistant client 106 during an audio dialog session. For example, turn 201 includes natural language input of the user that can be provided to automated assistant client 106 via microphone 108 as audio input or via a keyboard as textual input. The response 202 of the automated assistant can be provided as audio via a speaker of the client device 105 or via a visual interface that is similar to the interface 200 of FIG. 2. Response 202 includes information from a document that can be identified by search engine 120 from the natural language input of turn 201. Subsequently, the user indicates "What else have you found?" as a dialog turn 203 to the automated assistant client 106, which then provides another dialog turn 204 that includes information from a second document that can be identified by the search engine 120 in response to the dialog turn 203.

In some implementations, the first provided document (i.e., the document with the information provided in turn 202) may have a generated score that is more indicative of the topic of the initially submitted phrase 201 than the second provided document. For example, search engine 120 can rank resulting responsive documents and provide information from the first document initially and subsequently for each of the ranked documents such that information provided to the user may be from higher ranked documents before lower ranked documents.

Additionally or alternatively, a user may be provided with a list of documents and/or a list of references to documents identified by the search engine 120 in response to natural language input that includes a topic. For example, referring to FIG. 3, an interface 300 for providing search results is illustrated. The search results include a reference to a first document 301, a reference to a second document 302, a reference to a third document 303, and a reference to a fourth document 304. The interface can be provided to the client device 105 of the user by a component that shares one or more characteristics with search interface 107. Each of the references can be selectable (e.g., clickable) by the user and when the user selects a reference, the search interface can provide the related document, a portion of the document to the user, and/or information extracted from the document. Additionally, each of the selectable links includes information from the associated document to allow the user to view a portion or summary of the document before selecting a reference. For each of the references, search engine 120 can determine a score for the associated document and the references can be provided to the user via the interface 300 in a manner reflective of the scores of the documents. For example, the first referenced document 301 may have a generated score that is more indicative of relevancy and/or relatedness to a topic of interest to a user than the second referenced document 302, which may have a score more indicative of the same criteria than the third referenced document 303.

Referring back to FIG. 1, user document database 140 includes references to and/or documents that have been presented to the user in whole, in part, and/or in summarized form. As the user is presented information from documents, user document database 140 may be updated to include information related to the presented documents, such as entities in the document, an identifier of a location of the document, a semantic vector representative of the text of a document, etc. The data stored in user document database 140 may be applied as input across a trained machine learning model, e.g., in conjunction with data indicative of one or more new documents, to determine information gain scores for the one or more new documents.

Figure 3:
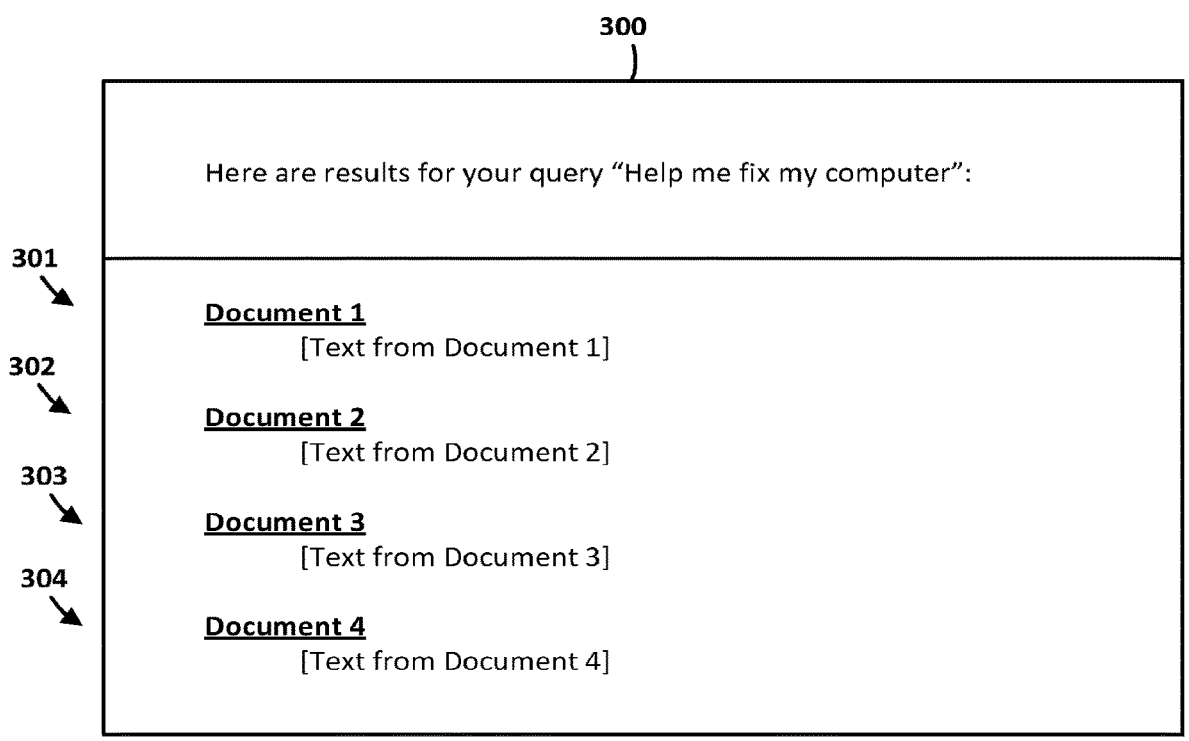
FIG. 3 illustrates an interface for a search interface that can provide references to documents based on information gain scores of the documents.
Figure 4:
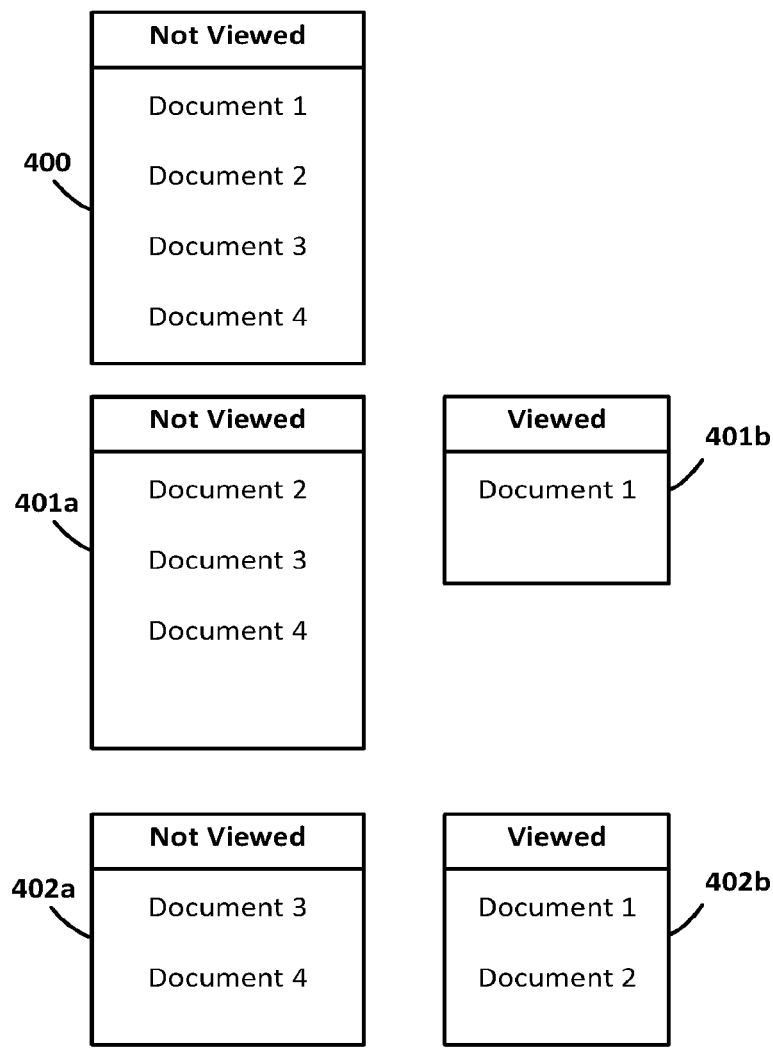
FIG. 4 illustrates a set of documents that have been labeled based on whether the document has been viewed by the user.

Referring to FIG. 4, a set 400 of documents can be provided to the user, e.g., in response to a search query provided to a search engine and/or in response to a natural language input provided to an automated assistant. Set 400 includes four documents, none of which yet have been presented to the user. The documents can be, for example, responsive and/or relevant documents provided in the search result interface 300 of FIG. 3 in response to a search query, and/or documents that are responsive and/or relevant to a natural language input provided by a user to an automated assistant, and which have not yet been utilized by the automated assistant to provide information in dialog turns of FIG. 2.

Suppose a user is presented information indicative of Document 1, e.g., during a dialog turn with an automated assistant or as a result of a user selecting a search result from an interface such as that depicted in FIG. 3. Sets 401a and 401b depict how the four documents may be affected. Set 401a includes three of the documents of set 400 and set 401b includes one of the documents of set 400. Set 401a is representative of the documents that have not yet been viewed by the user and set 401b is representative of the document that has been presented to the user (e.g., information from the document of set 401b provided in a dialog turn of the automated assistant and/or a document that the user has selected a reference in the interface of FIG. 3).

Now, suppose the user is next presented information indicative of Document 2. Sets 402a and 402b depict how the four documents may be affected. Set 402a includes two documents that have not been presented to the user and set 402b includes two documents that have been presented to the user previously (e.g., after subsequent dialog turns and/or after viewing a document, returning to the references of FIG. 3 and selecting a different reference to a new document). In each case, as the user is presented information from more documents, user document database 140 may be updated to include information related to each of the presented documents. In some implementations, the references in user document database 140 may be stored after a search session has been terminated. In some implementations, each session (i.e., each time a topic is provided by the user) will have an independent set of viewed documents that is not persisted through multiple topic submissions.

In various implementations, information scoring engine 125 may be configured to determine an information score gain for each document identified by search engine 120 that has not been presented to the user. For example, referring again to FIG. 4, all of the documents of set 400 have not been viewed by the user so an information gain score may not be generated for any of the documents (or an arbitrary score may be assigned to each indicating an equal information gain score for all of the documents). Once the user has been presented information from the document in set 401b, a new information gain score can be determined for each of the documents of set 401a. For a given unpresented document, the generated information gain score is indicative of the information gain of the given unpresented document in light of the document(s) already presented to the user. Thus, the information gain score is computed based on the documents already presented to the user and/or the information contained in those documents in view of information contained in the new document.

As an example, the user may provide a topic of "Help me fix my computer" and be provided the four documents of FIG. 4. The user can select Document 1 and view the document. Based on viewing the document, information gain scoring engine 125 can determine an information gain score for Document 2, Document 3, and Document 4. Each of the information gain scores is indicative of information gain of that document given that the user has viewed Document 1. For example, Document 1 may include common software troubleshooting techniques for fixing a computer and Document 2 may additionally include common software application issues that can be resolved by a user. Document 3, however, may include common computing hardware troubleshooting techniques as well as software solutions. Finally Document 4 may include only hardware solutions to computer issues. Thus, because Document 1 and Document 2 have overlapping content that may be identical, information gain scoring engine 125 may determine an information gain score that is less indicative of information gain for Document 2 than for Document 3 and Document 4, which may include information that was not included in Document 1. Further, the determined score for Document 4 may be more indicative of information gain than Document 2 and Document 3 is the information in Document 4 is not included at all in Document 2 and Document 3 (i.e., a gain of completely different information).

In various implementations, information to be provided to the user can be extracted from a document which is selected on the basis of the information gain score. In this way, information provided to the user can be streamlined by preferentially outputting new information. In some implementations, the unnecessary output of repeated or redundant information can be reduced by determining the information gain score. In implementations which include an audio or TTS output, as described above, a corresponding reduction may be provided in the overall output time, in a number of user interruptions, or in a number of extra dialog turns.

In some implementations, information gain scoring engine 125 can utilize documents that have been presented to the user and other documents related to the same topic as input across a machine learning model. For example, input to the machine learning model may include a pair of documents $<d_1, d_2>$, where $d_1$ is an already-consumed/presented document and $d_2$ is a yet-to-be-consumed/presented document. Output of the machine learning model may be indicative of an information gain score of document $d_2$ over document $d_1$. Various types of machine learning models may be employed, such as various types of neural networks (e.g., feed-forward, convolutional, etc.), support vector machines, Bayesian classifiers, etc.

In some implementations, a machine learning model may be trained using training data that also includes pairs of documents $<d_1, d_2>$ (or pairs of semantic representations, such as embeddings, generated from the pairs of documents). Each pair of documents (or the respective pairs of semantic representations) may be labeled with an information gain score associated with the second document $d_2$ (i.e. indicative of how much information would be gained by a user if the user were presented with information from $d_2$ after already having been presented with information from $d_1$). A training example $<d_1, d_2>$ may be applied as input across the trained model to generate output. The output may be compared to a label assigned to the training example to determine an error. The error may be used to train the machine learning model, e.g., using techniques such as gradient descent (e.g., stochastic, batch) and/or back propagation (in the case of a neural network).

In some such implementations, the labels assigned to the training examples may be generated manually. For example, one or more individuals may read the documents and then provide a subjective information gain score representing how much additional (or novel) information they feel they gained in list of consuming $d_2$ after consuming $d_1$. Information gain scores, whether manifested in training data labels or output by a trained machine learning model, may take various forms, such as a value between zero and one, a value along a range of numbers, etc. This information gain score may be assigned as a label to a training example that includes the pair of documents consumed by the user.

Additionally or alternatively, in some implementations, training data may be developed while one or more individuals simply search for and consume documents in the ordinary course of their lives. As they view consecutive documents returned in response to a search query, they may be asked (e.g., via a web browser plugin), for each new document they consume, a question such as "What this document/information helpful in view of what you've already read?" or "Was this document redundant?" The individuals' answers to these questions may be used to label training examples generated from those documents. Training may then proceed similarly as described previously.

In some implementations, a semantic representation of each of the documents presented to the user and each of the other documents identified by search engine 120 and not presented to the user can be provided as input to the machine learning model and the output of the machine learning model can be utilized to determine information gain scores for each of the unviewed documents. For example, representations of the documents of set 402b can be provided as input across a machine learning model and indicated as "Not presented" and representations of the two documents of set 402a can be provided as input and indicated as "previously presented" (e.g., based on identifying the documents as already viewed in user document database 140). Output from the machine learning model can be utilized to determine an information gain score for Document 3 and an information gain score for Document 4, each of which is indicative of information gain for that document given the user has already viewed Document 1 and Document 2. Further, if the user then views Document 3 (or is provided information from Document 3 by automated assistant client 106), a new information gain score can be determined for Document 4 given that information contained in the other three documents has been presented to the user.

In some implementations, semantic vectors of each of the documents can be determined and utilized as input across the machine learning model. A semantic vector may be, for instance, a numerical representation of a document as a vector and can be utilized to determine similarity between documents based on proximity in a vector space. In some implementations, a semantic vector may be generated by another trained machine learning model, such as the word2vec model.

For example, an autoencoder (e.g., word2vec) may be trained to receive text as input, encode a semantic representation using an encoder portion, and then reconstruct the original text input using a decoder portion. Once trained, the encoder portion alone may be used to generate semantic representations (e.g., semantic vectors) of documents that may then be applied as input across the aforementioned trained machine learning. Thus, for each of the documents identified by search engine 120, a semantic vector can be generated. As documents are viewed by the user, the semantic vectors can be provided as input across the machine learning model, with the labels of "Viewed" and "Not Viewed" changed as the user views the documents.

As noted previously, in some implementations, an information gain annotation engine 130 may generate annotated training data based on annotations of human curators of documents. For example, a curator may be provided with a first document and a second document ($d_1$ and $d_2$ described previously), and the curator may assign a value to the second document $d_2$ that is indicative of information gain of the second document after viewing the first document. Also, for example, a user in a session of the search interface 107 may be asked to rate and/or rank information gain of a document during the search session (e.g., a pop-up asking the user to rate information gained from a viewed document based on other documents viewed during the session). The annotations can be utilized to generate training data that indicates information gain as determined by human curators and the training data can be provided to the machine learning model as input to train the model to determine meaningful output (e.g., scores that are indicative of information gain for a given set of documents).

In some implementations, semantic representations of multiple documents already presented to the user may be applied as input across the model along with a semantic representation of the new document. For example, a first set of n inputs may be reserved for semantic features extracted from already-presented documents, and a second set of m inputs may be preserved for semantic features extracted from a new document. Thus, the overall dimensionality of the inputs is set at n+m. In some cases, if all n inputs of the first set are not needed (e.g., not enough semantic features extracted), then those inputs may be left blank or filled with arbitrary values, such as zeros, to minimize or eliminate any impact they might have on the ultimate output of the machine learning model.

In some implementations, documents that have not been viewed by the user can be reranked based on the information gain scores of the documents. For example, a user may be provided with information from a first document by automated assistant client 106 based on the first document having a score that indicates it is most relevant to the topic provided by the user. Other documents (i.e., new documents) can then be reranked based on previously determined scores as well as the information gain score generated based on the user being provided information from the first document. The reranking based on the information gain scores may result in one or more documents being promoted and/or demoted in a ranked list. Thus, if the user subsequently requests information of a new document, the user may be provided with a document that has a greater information gain than the already viewed document and not based just on an initially ranked list of documents.

As an example, the user can submit natural language input of "Help me fix my computer." Documents may be identified by search engine 120, as described herein, and ranked based on content into a ranked list, such as the list of set 400 in FIG. 4. Information from Document 1 may be provided as the most relevant document based on the ranking and provided as a turn 202 of FIG. 2. The remaining documents can be scored by information gain scoring engine 125 and reranked according to the determined scores. In the reranking, Document 4 may be determined to have a greater information gain based on the user being provided Document 1 (e.g., Document 4 includes more information not included in Document 1 as compared to Documents 2 and 3). Thus, if the user subsequently requests a new document, as indicated by dialog turn 203, the information in dialog 204 can be generated from Document 4 and not from Document 2 (i.e, the otherwise higher ranked document before accounting for information gain scores).

In this way, a user may be directed towards a further document with greater information gain, which can result in the user receiving a desired or required item of information sooner, or with fewer input interactions. As such, a query session between the user and the search engine can be made shorter or more efficient by preferentially ranking documents based on a greater information gain. In some implementations, a shorter query session or fewer dialog turns can provide a corresponding reduction in the resource demands of the system e.g. with respect to memory and/or power usage of the system.

Similarly, the references of documents provided in FIG. 4 can be updated based on calculating information gain scores for the documents associated with the references. The user may first be provided a list of references that is ranked such that Document 1 appears first, then Document 2, etc. If the user selects the link to Document 1, the remaining documents can be scored by information gain scoring engine 125, reranked, and presented in a different order if the user navigates back to the list of references (e.g., Document 4 may now appear higher in the list than Document 2). Also, for example, one or more documents may no longer appear in the list of ranked documents based on a determined information gain score. For example, a document may be determined to include identical information as another unviewed document, and the identical unviewed document may be removed from the list (or at least demoted substantially) of references if the user subsequently navigates back to the list. A reference no longer being included in a list of ranked documents may be indicative of, for example, a determined zero information gain by the user if the user views the identical new document.

Figure 5:
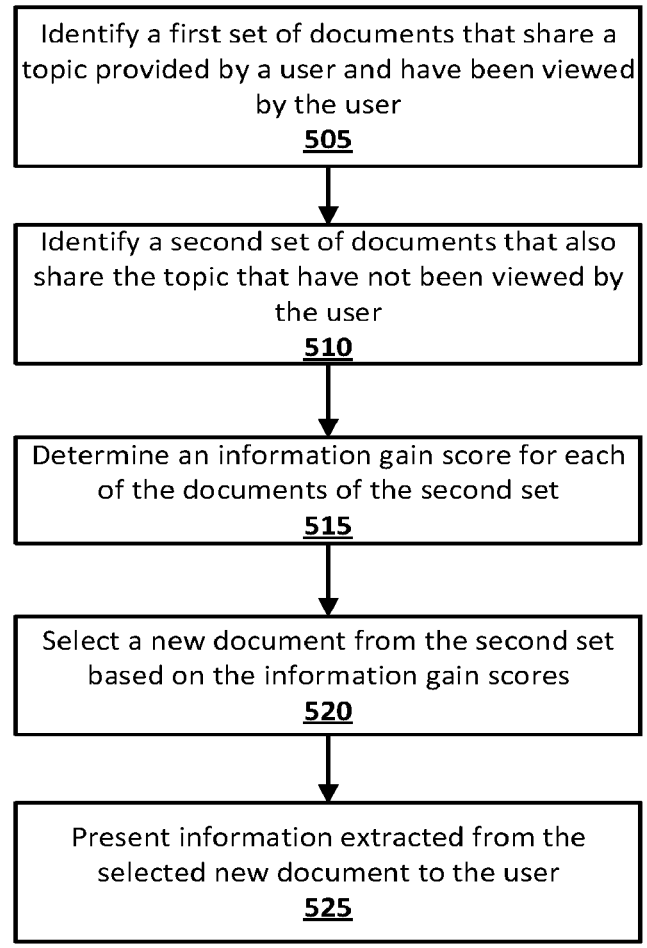
FIG. 5 illustrates a flowchart of an example method presenting information extracted from a new document to a user based on the information gain score of the new document.

FIG. 5 illustrates a flowchart of an example method presenting information from a document to a user based on information gain scores determined for unviewed documents. The steps of FIG. 5 can be performed by one or more processors, such as one or more processors of a client device. Other implementations may include additional steps than those illustrated in FIG. 5, may perform step(s) of FIG. 5 in a different order and/or in parallel, and/or may omit one or more of the steps of FIG. 5.

At step 505, a first set of documents are identified that share a common topic and that have been viewed by the user. The topic can be identified based on natural language input of the user to an automated assistant, such as automated assistant client 106 of FIG. 1. In some implementations, the input may be spoken and received by a component that shares one or more characteristics with microphone 108. In some implementations, the input can be textual and can be provided by the user via a search interface. The first set of documents includes documents that may have been viewed (or listened to) by the user based on previous dialog turns of a dialog session with the automated assistant client 106 and/or based on the user previously selecting the documents via the search interface 107.

At step 510, a second set of documents that also share the topic of the first set of documents but that have not been viewed by the user are identified. The second set of documents can be identified by a component that shares one or more characteristics with search engine 120. For example, the topic identified from the natural language input may be utilized by the search engine 120 to identify documents responsive and/or relevant to the search topic. Further, a component that shares one or more characteristics with user document database 140 may include information related to documents that have already been viewed by the user. Thus, the second set of documents may be a subset of a larger set of documents with documents removed that have already been viewed by the user.

At step 515, an information gain score is determined for each of the documents of the second set of documents. The information gain score is indicative of, for a document of the second set, the information gain of a user being presented information from the document given that the user has already been presented information from the document(s) of the first set of documents. In some implementations, the information gain scores can be determined based on the output of a machine learning model that has been provided information related to the first set of documents and a document of the second set of documents as input. For example, a semantic vector for each of the documents of the first set of documents and a semantic vector of a new document of the second set of documents can be provided as input across a machine learning model and the output of the machine learning model can be utilized to determine an information gain score for the new document. The score may be, for example, a quantitative score between 0.00 and 1.00, with 0.00 indicating that no information gain is to be expected if the user views the document given the documents already viewed by the user, and a score of 1.00 indicating that the new document includes only information that is not included in the previously viewed documents (e.g., total information gain).

At step 520, one or more new documents are selected from the second set of documents based on the information gain scores. In some implementations, a single new document is selected based on the information gain score of the document being more indicative of information gain than all other documents of the second set. In some implementations, one or more scores already associated with the documents of the second set of documents can utilized with the information gain scores to select a document. For example, each of the documents of the second set of documents may be scored by search engine 120 and the scores may be adjusted based on information gain scores determined for the documents by the information gain scoring engine 125.

At step 525, one or more of the documents of the second set and/or information extracted from one or more of the documents is presented to the user based on the information gain scores. In some implementations, information extracted from the selected new document can be provided to the user via a component that shares one or more characteristics with automated assistant client 106. For example, a TTS module may convert a portion of the new document to speech and provide the portion of text to the user via a speaker of the client device 105. In some implementations, a list of references to the second set of documents can be provided to the user via a component that shares one or more characteristics with search interface 107. For example, the user may be provided with a ranked list of documents that is ranked based on the information gain scores and/or one or more other scores determined for the documents. In some implementations, a list of references and/or the set of documents may be rescored by the information gain scoring engine 125 as the user views additional documents. For example, the user may be provided with a first ranked list of references, select one of the new documents to view, and navigate back to the list of references. The references may be updated (e.g., reranked, references removed, references presented differently) when the user returns to the list based on updated information gain scores.

In this way, the information presented to the user can be improved in view of the amount of information provided. The information density of the output provided by the automated assistant client 106 can be increased by, for example, preferentially outputting new information. As such, the automated assistant client 106 can avoid outputting repeated or redundant information. In some implementations, a TTS module may be required to convert a smaller amount of text to output as speech, providing a corresponding reduction in the processing required by the TTS module, as well as the overall output time, the number of user interruptions, and the number of extra dialog turns.

For example, suppose a user engages with an automated assistant using vocal natural language input. Suppose further that the user seeks help about a computer error message, and speaks the request, "Why am I receiving the error message, <hypothetical error message text>?". A first document may be identified that is responsive to the user's request. Suppose the first document includes a first information element (e.g., topic, fact, etc.) associated with a first potential cause of the error message and a second information element associated with a second different potential cause of the error message.

In various implementations, the automated assistant may process one or more portions of the first document that include the first and second information elements using text-to-speech ("TTS") processing to generate TTS output that conveys the first and second information elements. For example, the automated assistant may identify one or more sentences that mention and/or relate to the first potential cause of the error message. Based on these identified one or more sentences, the automated assistant may generate natural language output—e.g., directly from the document as an excerpt or using natural language generation technology such as Tensorflow to summarize the first information element)—that conveys the first potential cause of the error message. The automated assistant may do the same with the second potential cause of the error message. The TTS output may be provided at one or more computing devices of the user, e.g., as audible natural language output.

Now, suppose a second document is also identified in response to the user's original request, and that after the user is presented with the TTS output discussed previously, the user issues a follow-up request, such as "what else could be the cause of this error message?" Suppose further that the second document includes the second information element and a third information element that is different from both the first and second information elements. For example, the third information element could be a third potential cause of the computer error message that is different than the first and second potential causes of the computer error message. In various implementations, it may be determined, e.g., by the automated assistant based on the prior provision of the TTS output, that the second information element has already been conveyed to the user.

Consequently, the automated assistant may process one or more portions of the second document that include the third information element using additional TTS processing to generate additional TTS output that conveys the third information element and excludes the second information element. For example, one or more sentences, phrases, or other passages or snippets in the third document that mention or relate to the third potential cause of the computer error may be identified. TTS processing may then be applied to generate, for instance, excerpts directly from the second document and/or natural language output that summarizes these sentences, phrases, or other passages or snippets. This additional TTS output may be provided at one or more computing devices operated by a user. Thus, the user may be presented with summary information about each of the first, second, and third potential causes of the computer error message, without being provided with redundant information. As noted above, providing information from documents to a user audibly, even if in summary form, takes a relatively long time, and eliminating any redundant information may improve the user experience substantially.

Figure 6:
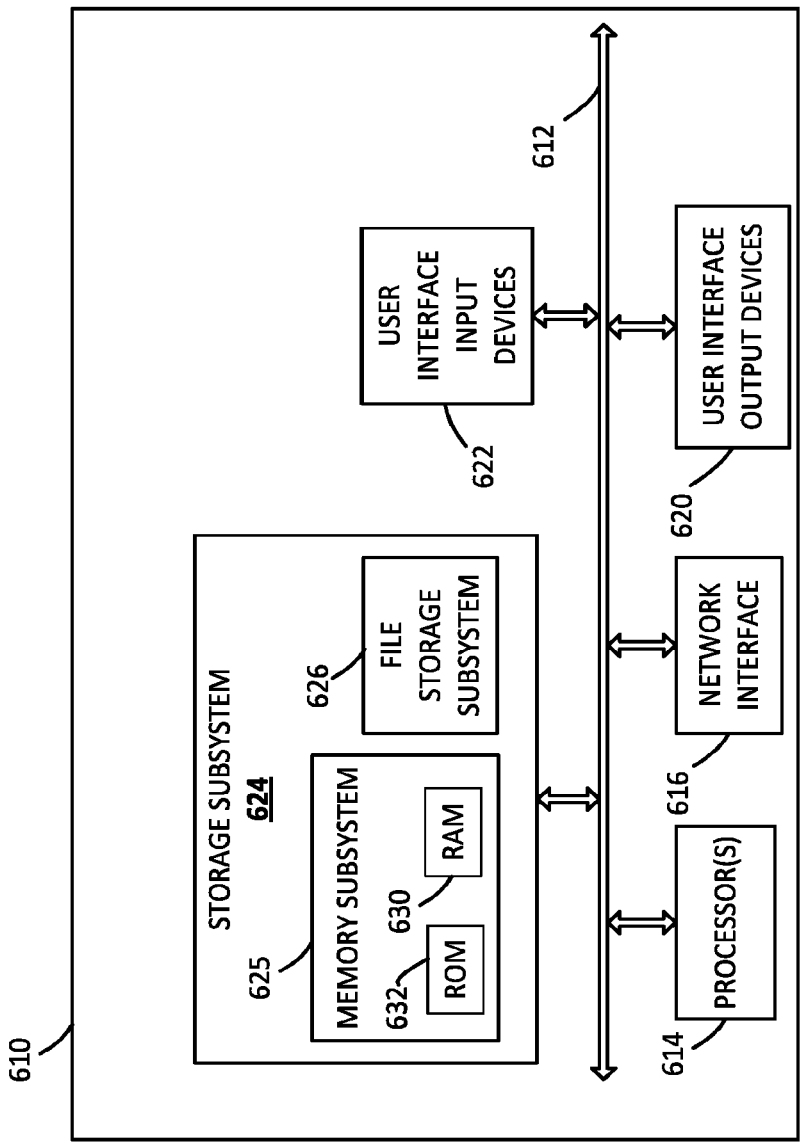
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   receiving a query from a user, wherein the query includes a topic;
   identifying a first set of documents that are responsive to the query, wherein the documents of the set of documents are ranked, and wherein a ranking of a given document of the first set of documents is indicative of relevancy of information included in the given document to the topic;

selecting, based on the rankings and from the documents of the first set of documents, a most relevant document;
providing at least a portion of the information from the most relevant document to the user;
in response to providing the most relevant document to the user, receiving a request from the user for additional information related to the topic;
identifying a second set of documents, wherein the second set of documents includes at one or more of the documents of the first set of documents and does not include the most relevant document;
determining, for each document of the second set, an information gain score, wherein the information gain score for a respective document of the second set is based on a quantity of new information included in the respective document of the second set that differs from information included in the most relevant document;
ranking the second set of documents based on the information gain scores; and
causing at least a portion of the information from one or more of the documents of the second set of documents to be presented to the user, wherein the information is presented based on the information gain scores.

2. The method of claim 1, further comprising:
selecting a new document from the second set of documents based on the information gain scores; and
presenting information extracted from the selected new document to the user via one or more of the computing devices.

3. The method of claim 1, further comprising extracting, from a given document of the second set of documents, new information that differs from the information contained in each document of the first set.

4. The method of claim 3, further comprising presenting the new information in proximity with a selectable link of the selectable list that corresponds to the given document.

5. The method of claim 1, wherein identifying the first set comprises:
causing to be rendered, as part of a search results interface that is presented to the user in response to a previous query that includes the topic, references to one or more documents of the first set;
receiving user input that that indicates selection of one of the references to a particular document of the first set from the search results interface, wherein at least part of the particular document is provided to the user in response to the selection;
receiving user input indicative of a command to return to the search results interface; and
in response to receiving the user input indicative of the command to return to the search results interface, causing to be rendered, as part of the search results interface, references to one or more documents of the second set.

6. The method of claim 5, wherein causing the references to one or more documents of the second set to be rendered includes excluding, from the search results interface, at least the reference to the particular document of the first set.

7. The method of claim 1, wherein determining the information gain score for the respective new document comprises providing first data indicative of the first set of documents and second data indicative of the respective new document as input to a machine learning model to generate output, wherein the information gain score is determined based on the output.

8. A system comprising one or more processors and memory storing instructions that, in response to execution of the instructions, cause the one or more processors to:
receive a query from a user, wherein the query includes a topic;
identify a first set of documents that are responsive to the query, wherein the documents of the set of documents are ranked, and wherein a ranking of a given document of the first set of documents is indicative of relevancy of information included in the given document to the topic;
select, based on the rankings and from the documents of the first set of documents, a most relevant document;
provide at least a portion of the information from the most relevant document to the user;
in response to providing the most relevant document to the user, receive a request from the user for additional information related to the topic;
identify a second set of documents, wherein the second set of documents includes at one or more of the documents of the first set of documents and does not include the most relevant document;
determine, for each document of the second set, an information gain score, wherein the information gain score for a respective document of the second set is based on a quantity of new information included in the respective document of the second set that differs from information included in the most relevant document;
rank the second set of documents based on the information gain scores; and
cause at least a portion of the information from one or more of the documents of the second set of documents to be presented to the user, wherein the information is presented based on the information gain scores.

9. The system of claim 8, wherein the instructions further include instructions to:
select a new document from the second set of documents based on the information gain scores; and
present information extracted from the selected new document to the user via one or more of the computing devices.

10. The system of claim 8, wherein the instructions further include instructions to: extract, from a given document of the second set of documents, new information that differs from the information contained in each document of the first set.

11. The system of claim 10, wherein the instructions further include instructions to: present the new information in proximity with a selectable link of the selectable list that corresponds to the given document.

12. The system of claim 8, wherein the instructions to identify the first set includes instructions to:
cause to be rendered, as part of a search results interface that is presented to the user in response to a previous query that includes the topic, references to one or more documents of the first set;
receive user input that that indicates selection of one of the references to a particular document of the first set from the search results interface, wherein at least part of the particular document is provided to the user in response to the selection;
receive user input indicative of a command to return to the search results interface; and
in response to receiving the user input indicative of the command to return to the search results interface, cause to be rendered, as part of the search results interface, references to one or more documents of the second set.

13. The system of claim 8, wherein the instructions to cause the references to one or more documents of the second set to be rendered includes instructions to exclude, from the search results interface, at least the reference to the particular document of the first set.

14. The system of claim 8, wherein the instructions to determine the information gain score for the respective new document includes instructions to provide first data indicative of the first set of documents and second data indicative of the respective new document as input to a machine learning model to generate output, wherein the information gain score is determined based on the output.

15. A non-transitory computer-readable medium comprising instructions that, in response to execution of the instructions by a processor, cause the processor to:
   receive a query from a user, wherein the query includes a topic;
   identify a first set of documents that are responsive to the query, wherein the documents of the set of documents are ranked, and wherein a ranking of a given document of the first set of documents is indicative of relevancy of information included in the given document to the topic;
   select, based on the rankings and from the documents of the first set of documents, a most relevant document;
   provide at least a portion of the information from the most relevant document to the user;
   in response to providing the most relevant document to the user, receive a request from the user for additional information related to the topic;
   identify a second set of documents, wherein the second set of documents includes at one or more of the documents of the first set of documents and does not include the most relevant document;
   determine, for each document of the second set, an information gain score, wherein the information gain score for a respective document of the second set is based on a quantity of new information included in the respective document of the second set that differs from information included in the most relevant document;
   rank the second set of documents based on the information gain scores; and
   cause at least a portion of the information from one or more of the documents of the second set of documents to be presented to the user, wherein the information is presented based on the information gain scores.

16. The at least one non-transitory computer-readable medium of claim 15, wherein the instructions further include instructions to:
   select a new document from the second set of documents based on the information gain scores; and
   present information extracted from the selected new document to the user via one or more of the computing devices.

17. The at least one non-transitory computer-readable medium of claim 15, wherein the instructions further include instructions to: extract, from a given document of the second set of documents, new information that differs from the information contained in each document of the first set.

18. The at least one non-transitory computer-readable medium of claim 17, wherein the instructions further include instructions to: present the new information in proximity with a selectable link of the selectable list that corresponds to the given document.

19. The at least one non-transitory computer-readable medium of claim 15, wherein the instructions to identify the first set includes instructions to:
   cause to be rendered, as part of a search results interface that is presented to the user in response to a previous query that includes the topic, references to one or more documents of the first set;
   receive user input that that indicates selection of one of the references to a particular document of the first set from the search results interface, wherein at least part of the particular document is provided to the user in response to the selection;
   receive user input indicative of a command to return to the search results interface; and
   in response to receiving the user input indicative of the command to return to the search results interface, cause to be rendered, as part of the search results interface, references to one or more documents of the second set.

20. The at least one non-transitory computer-readable medium of claim 15, wherein the instructions to cause the references to one or more documents of the second set to be rendered includes instructions to exclude, from the search results interface, at least the reference to the particular document of the first set.

* * * * *